(12) United States Patent
Spade et al.

(10) Patent No.: US 8,393,287 B2
(45) Date of Patent: Mar. 12, 2013

(54) SPONSONS FOR A WATERCRAFT

(75) Inventors: Sam Spade, Palm Bay, FL (US); Rick Adamczyk, St-Cloud, FL (US)

(73) Assignee: Bombardier Recreational Products Inc., Valcourt (CA)

( * ) Notice: Subject to any disclaimer, the term of this patent is extended or adjusted under 35 U.S.C. 154(b) by 176 days.

(21) Appl. No.: 12/956,126

(22) Filed: Nov. 30, 2010

(65) Prior Publication Data

US 2012/0132125 A1 May 31, 2012

(51) Int. Cl.
*B63B 1/22* (2006.01)
(52) U.S. Cl. ........................ 114/284; 114/126
(58) Field of Classification Search ............ 114/55.5, 114/55.54, 55.55, 126, 283, 284, 285
See application file for complete search history.

(56) References Cited

U.S. PATENT DOCUMENTS

| 5,404,830 | A | 4/1995 | Ligozio |
| 5,611,295 | A | 3/1997 | Stables |
| 5,643,023 | A | 7/1997 | Sober |
| 6,523,490 | B1 | 2/2003 | Watkins |
| 6,546,888 | B2 * | 4/2003 | Bertrand et al. ............ 114/126 |
| 6,712,016 | B1 | 3/2004 | Morisch et al. |
| 6,807,920 | B1 | 10/2004 | Wynne |
| 7,018,252 | B2 * | 3/2006 | Simard et al. ............... 114/162 |
| 7,168,386 | B2 | 1/2007 | Kochi et al. |
| 7,802,533 | B1 | 9/2010 | Chen et al. |

* cited by examiner

*Primary Examiner* — Lars A Olson
(74) *Attorney, Agent, or Firm* — BCF LLP

(57) ABSTRACT

A sponson for a watercraft has a sponson body having a front end, a rear end, a top edge and a bottom edge, and a vane connected to a side of the sponson body and extending away therefrom. The vane has a front end and a rear end. The front end of the vane is disposed closer to the bottom edge of the sponson than the rear end of the vane. A watercraft having sponsons of this type is also disclosed.

16 Claims, 5 Drawing Sheets

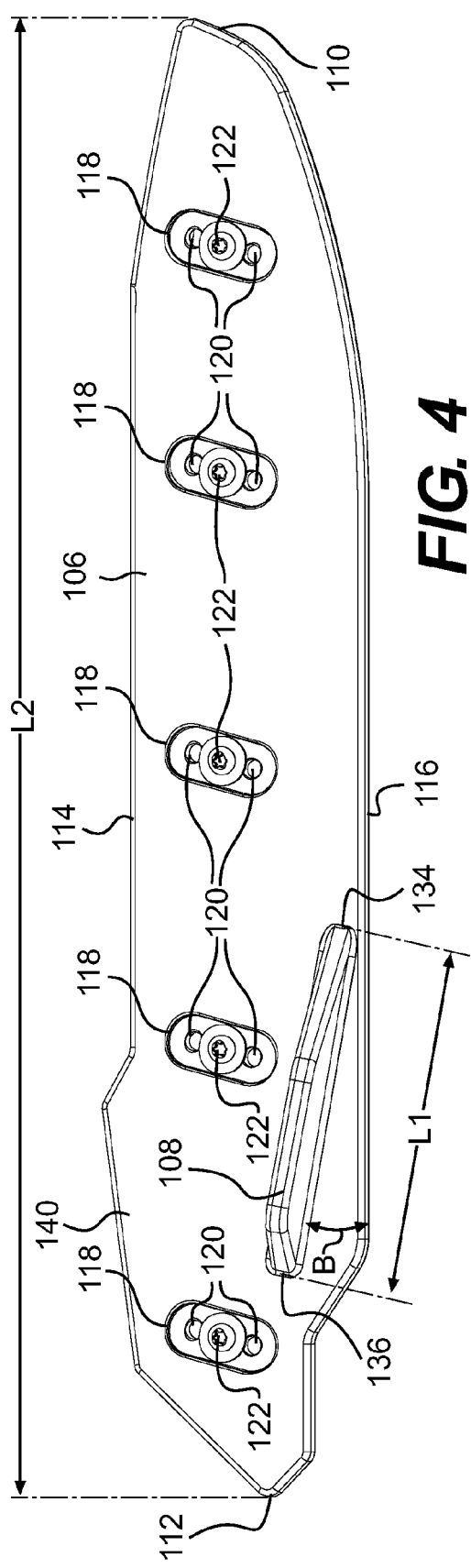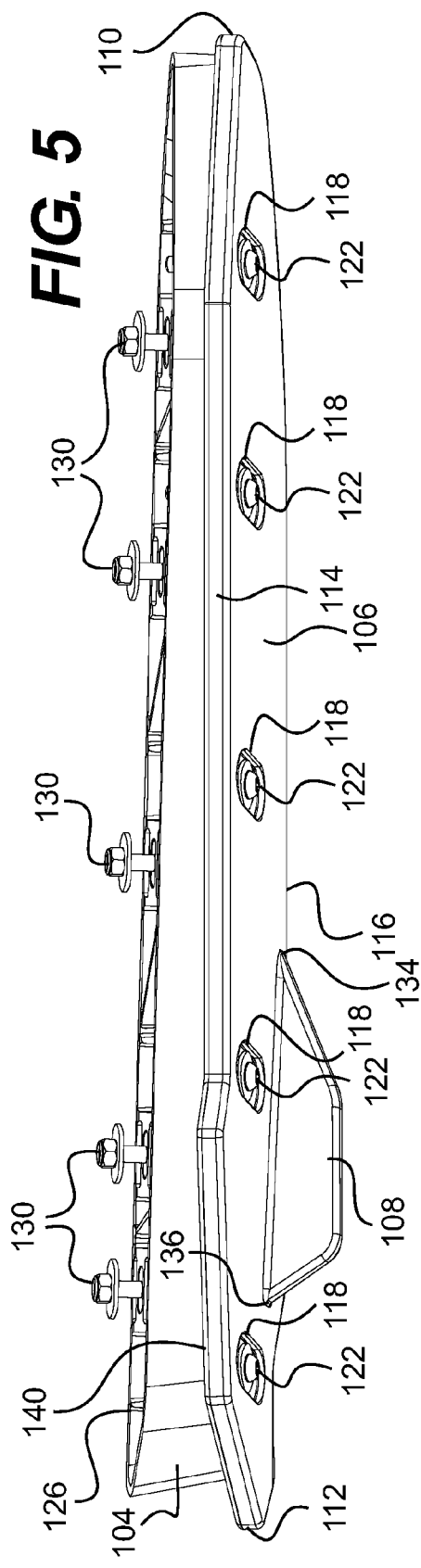

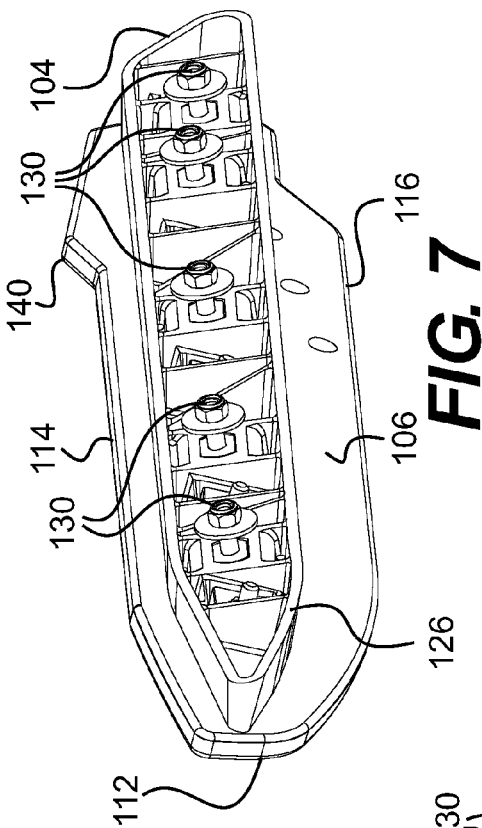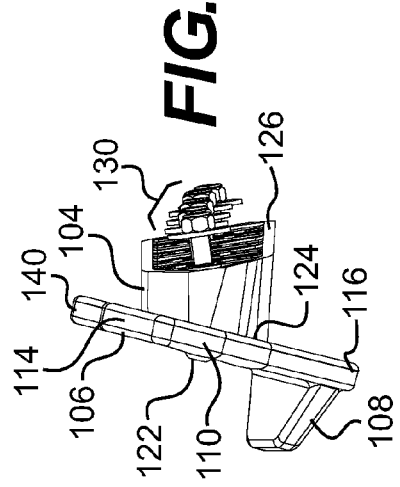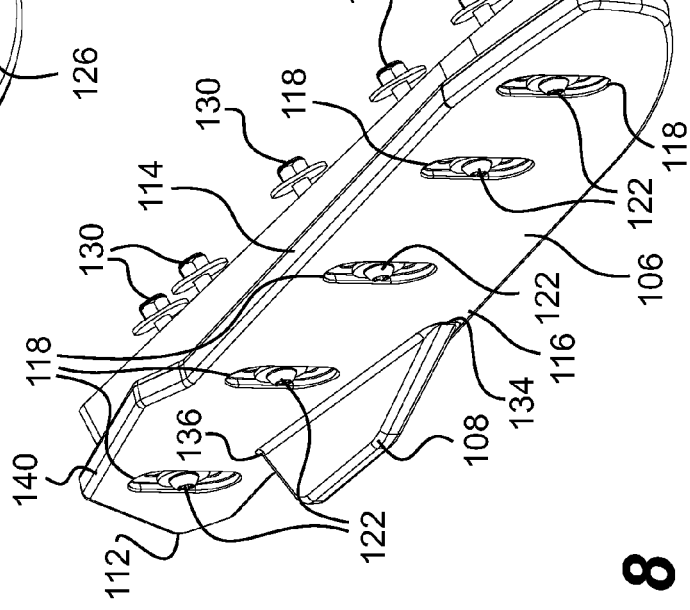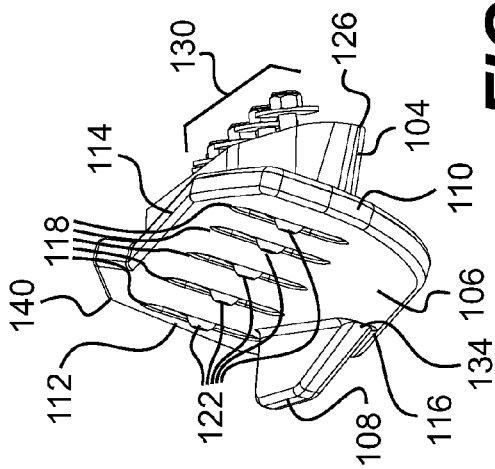

SPONSONS FOR A WATERCRAFT

TECHNICAL FIELD

The present invention relates to sponsons for watercraft and to watercraft having sponsons.

BACKGROUND

Current watercraft are stable and handle well. However, under certain driving conditions, although the watercraft handles adequately, it may be desirable to nonetheless reduce a turning radius of the watercraft.

One known solution consists in providing sponsons on either side of the watercraft near a transom thereof. The sponsons cause the transom to lift while the watercraft is in motion and assist in turning. However, when the watercraft leans into a turn in an attempt to reduce the turning radius, the sponson on the inside of the turn tries to lift the transom, thus working against the leaning of the watercraft.

Therefore, there is a need for a sponson for a watercraft that reduces a turning radius of the watercraft.

There is also a need for a watercraft having sponsons of this type.

SUMMARY

A sponson having a laterally extending vane is provided. The vane is angled such that its rear end is higher than its forward end. When a watercraft having this sponson leans into a turn, the vane of the sponson disposed on the inside of the turn comes into contact with the water. Due to its angle, water flows over the vane and a downward and rearward force is applied to the vane. As a result, the watercraft if leaned further into the turn effectively reduces the turning radius of the watercraft.

A watercraft having sponsons of the type recited above is also provided.

In one aspect, a sponson for a watercraft has a sponson body having a front end, a rear end, a top edge and a bottom edge, and a vane connected to a side of the sponson body and extending away therefrom. The vane has a front end and a rear end. The front end of the vane is disposed closer to the bottom edge of the sponson than the rear end of the vane.

In a further aspect, the vane extends generally perpendicularly to the sponson body.

In an additional aspect, the sponson body is a plate.

In a further aspect, the vane is disposed rearwardly of a longitudinal center of the sponson body.

In an additional aspect, a length of the vane is less than half a length of the sponson body.

In a further aspect, the length of the vane is less than a third of the length of the sponson body.

In an additional aspect, an angle between the vane and the bottom edge of the sponson body is less than 45 degrees.

In a further aspect, the angle between the vane and the bottom edge of the sponson body is less than 20 degrees.

In an additional aspect, the vane is a plate.

In a further aspect, the plate is pentagonnally shaped.

In an additional aspect, the sponson body is fastened to a mounting rail.

In a further aspect, a position of the sponson body relative to the mounting rail is adjustable.

In an additional aspect, the mounting rail has an inner surface adapted to abut a hull of the watercraft and an outer surface abutting the sponson body. The outer surface is angled relative to the inner surface such that the top edge of the sponson body is disposed closer to the inner surface than the bottom edge of the sponson.

In another aspect, a watercraft has a hull, a deck disposed on the hull, an engine connected to the hull, a propulsion system operatively connected to the engine, a first sponson body connected to a starboard side of the hull, a first vane connected to a side of the first sponson body and extending away therefrom, a second sponson body connected to a port side of the hull, and a second vane connected to a side of the second sponson body and extending away therefrom. Each of the first and second vanes is located in a rearward half of the hull. Each of the first and second vanes has a front end and a rear end. Each of the first and second vanes is angled such that its front end is disposed vertically lower than its rear end.

In a further aspect, each of the first and second vanes is located in a rearward third of the hull.

In an additional aspect, an angle between the each of the first and second vanes and a top edge of the hull is less than 45 degrees.

In a further aspect, an angle between the each of the first and second vanes and a top edge of the hull is less than 20 degrees.

In a further aspect, the first vane extends generally perpendicularly to the first sponson body, and the second vane extends generally perpendicularly to the second sponson body.

In an additional aspect, each of the first and second sponson bodies is angled relative to the hull such that a top edge of each of the first and second sponson bodies is disposed closer to a longitudinal centerplane of the watercraft than a lower edge of the first and second sponson bodies.

For purposes of this application, terms related to spatial orientation such as forwardly, rearwardly, left, and right are as they would normally be understood by a driver of the watercraft sitting thereon in a normal driving position. Also for purposes of this application, the term "sponson" refers to a structural projection from the side of the watercraft designed to increase lateral stability in the water.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 4 is a right side elevation view of a starboard sponson of the watercraft of FIG. 1;

FIG. 5 is a top plan view of the sponson of FIG. 4;

FIG. 6 is a front elevation view of the sponson of FIG. 4;

FIG. 7 is a perspective view taken from a front, left side of the sponson of FIG. 4;

FIG. 8 is a perspective view taken from a front, right side of the sponson of FIG. 4; and FIG. 9 is a perspective view taken from a top, front, right side of the sponson of FIG. 4.

DETAILED DESCRIPTION

A personal watercraft 10 having sponsons 100 will be described below. It is contemplated that the sponsons 100 could be used in combination with other types of watercraft such as, but not limited to, sport boats.

Figure 1:
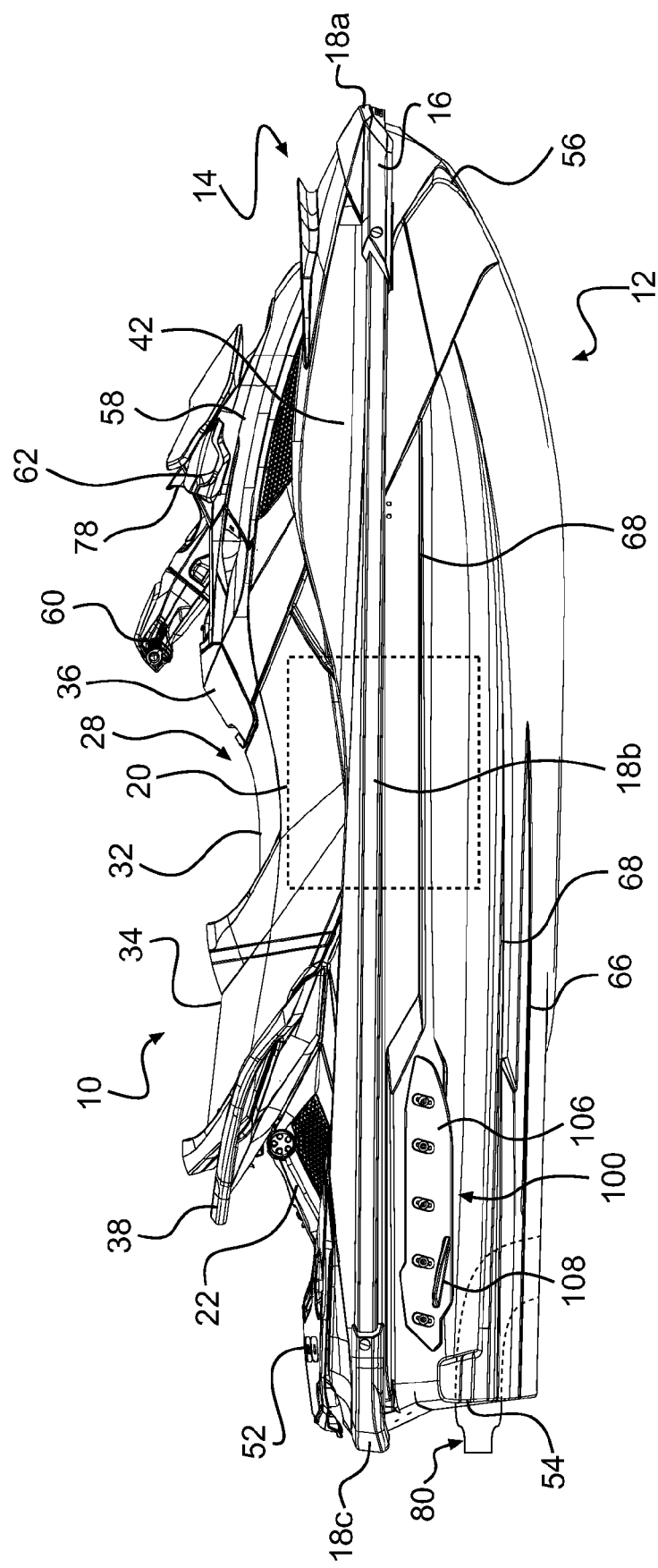
FIG. 1 is a right side elevation view of a personal watercraft.
Figure 2:
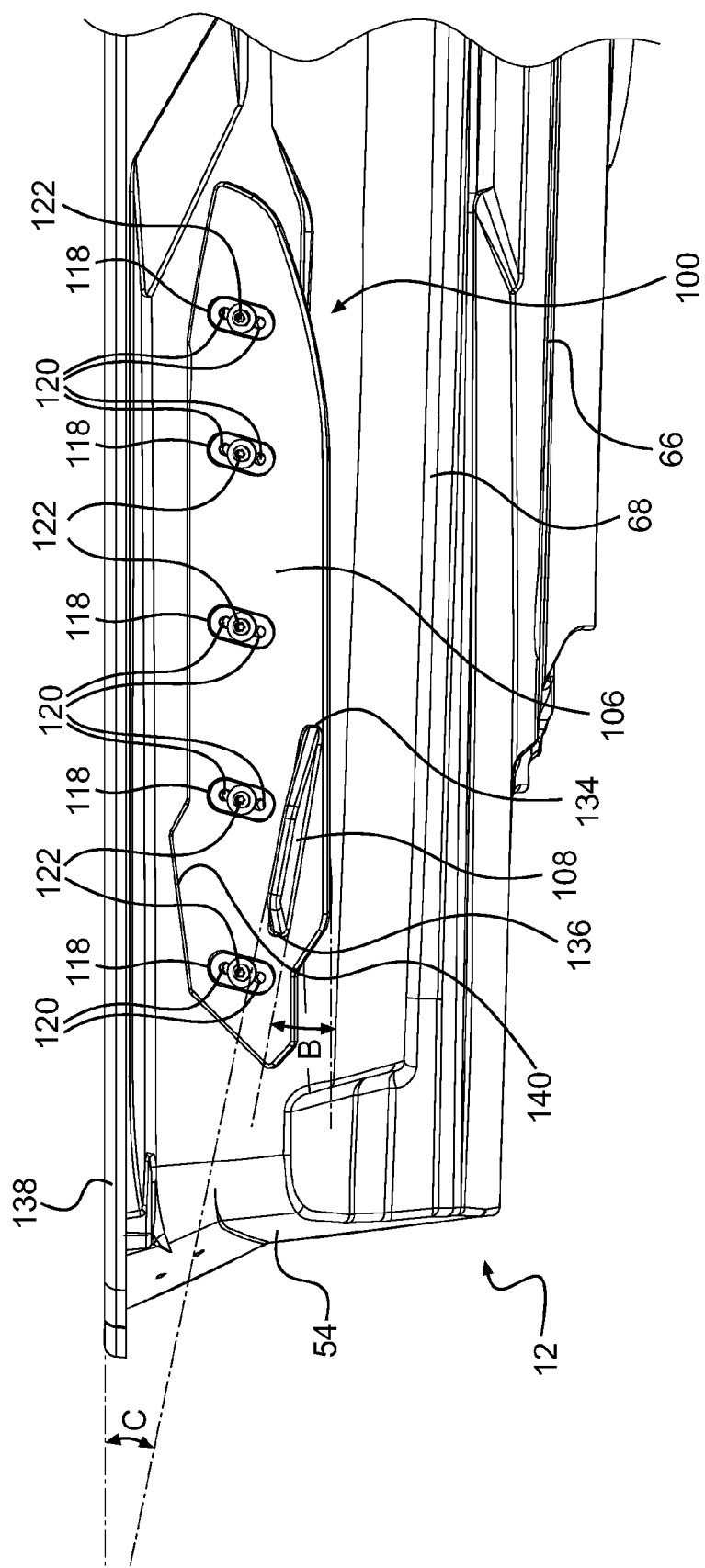
FIG. 2 is a right side elevation view of a rear portion of a hull of the watercraft of FIG. 1.

Referring to FIG. 1, the general construction of a personal watercraft 10 will be described. It should be understood that the personal watercraft 10 could have a construction other than the one described below.

The watercraft 10 is made of two main parts, including a hull 12 and a deck 14. The hull 12 buoyantly supports the watercraft 10 in the water. The deck 14 is designed to accommodate a rider and passengers. The hull 12 and deck 14 are joined together at a seam 16 that joins the parts in a sealing relationship. Preferably, the seam 16 comprises a bond line formed by an adhesive. Other known joining methods could be used to sealingly engage the hull 12 and deck 14 together, including but not limited to thermal fusion, molding or fasteners such as rivets or screws. Bumpers 18 generally cover the seam 16, which helps to prevent damage to the outer surface of the watercraft 10 when the watercraft 10 is docked, for example. The bumpers 18 include a bow bumper 18a that extends around a front portion of the bow 56, side bumpers 18b that extends along the port and starboard sides of the watercraft 10, and a transom bumper 18c that extends around the transom 54. It is contemplated that the watercraft 10 could have other bumper configurations. For example, it is contemplated that the watercraft 10 could have a single bumper 18 covering the entire seam 16.

The space between the hull 12 and the deck 14 forms a volume, inside of which the engine 20 (schematically shown in FIG. 1) is disposed, as well as a muffler, tuning pipe, gas tank, electrical system (battery, electronic control unit, etc.), air box and other elements required or desired in the watercraft 10.

The deck 14 has a centrally positioned straddle seat 28 positioned on top of a pedestal 22 to accommodate riders in a straddling position. The seat 28 is sized to accommodate three riders, but it is contemplated that the seat 28 could be designed to accommodate more or less than three riders. The seat 28 includes a first, front seat portion 32 and a rear, raised seat portion 34 that accommodates a passenger. The seat 28 is made as a cushioned or padded unit or interfitting units. The first and second seat portions 32, 34 are removably attached to the pedestal 22 by a hook and tongue assembly (not shown) at the front of each seat portion and by a latch assembly (not shown) at the rear of each seat portion, or by any other known attachment mechanism. The seat portions 32, 34 can be individually tilted or removed completely. One of the seat portions 32, 34 covers an engine access opening defined by a top portion of the pedestal 22 to provide access to the engine 20. The other seat portion (in this case portion 34) covers a removable storage box (not shown). A small storage box 36 is provided in front of the seat 28. A grab handle 38 is provided between the pedestal 22 and the rear of the seat 28 to provide a handle onto which a passenger may hold.

The watercraft 10 has a pair of generally upwardly extending walls located on either side of the watercraft 10 known as gunwales or gunnels 42. The gunnels 42 help to prevent the entry of water in the footrests (not shown) of the watercraft 10, provide lateral support for the rider's feet, and also provide buoyancy when turning the watercraft 10, since personal watercraft roll slightly when turning.

A reboarding platform 52 is provided at the rear of the watercraft 10 on the deck 14 to allow the rider or a passenger to easily reboard the watercraft 10 from the water when the watercraft 10 is at rest. Carpeting or some other suitable covering covers the reboarding platform 52. A retractable ladder (not shown) can be affixed to the transom 54 to facilitate boarding of the watercraft 10 from the water onto the reboarding platform 52.

The watercraft 10 is provided with a hood 58 located forwardly of the seat 28 and a steering assembly including a helm assembly 60. A hinge (not shown) is attached between a forward portion of the hood 58 and the deck 14 to allow the hood 58 to move to an open position to provide access to a front storage bin (not shown). A latch (not shown) located at a rearward portion of the hood 58 locks the hood 58 into a closed position. When in the closed position, the hood 58 prevents water from entering the front storage bin. Rearview mirrors 62 are positioned on either side of hood 58 to allow the rider to see behind the watercraft 10. A hook (not shown) is located at the bow 56 of the watercraft 10. The hook is used to attach the watercraft 10 to a dock when the watercraft 10 is not in use or to attach to a winch when loading the watercraft 10 on a trailer, for instance.

An exterior surface of the hull 12 is provided with a combination of strakes 66 and chines 68. A strake 66 is a protruding portion of the hull 12. A chine 68 is the vertex formed where two surfaces of the hull 12 meet. The combination of strakes 66 and chines 68 provide the watercraft 10 with its riding and handling characteristics.

The helm assembly 60 is positioned forwardly of the seat 28. The helm assembly 60 has a central helm portion, which may be padded, and a pair of steering handles, also referred to as a handlebar. One of the steering handles is provided with a throttle operator (not shown), which allows the rider to control the engine 20, and therefore the speed of the watercraft 10. The throttle operator can be in the form of a thumb-actuated throttle lever, a finger-actuated throttle lever, or a twist grip. The throttle operator is movable between an idle position and multiple actuated positions. The throttle operator is preferably biased towards the idle position, such that when the driver of the watercraft 10 lets go of the throttle operator, it will move to the idle position.

A display area or cluster 78 is located forwardly of the helm assembly 60. The display cluster 78 can be any display type, including, but not limited to, one or more of a liquid crystal display (LCD), dials or LED (light emitting diodes). The central helm portion has various buttons (not shown), which could alternatively be in the form of levers or switches, that allow the driver to modify the display data or mode (speed, engine rpm, time . . . ) on the display cluster 78. Buttons (not shown) may also be used by the driver to control a water jet propulsion system 80 of the watercraft 10.

The watercraft 10 is propelled by a water jet propulsion system 80 (schematically shown in FIG. 1) including a jet pump (not shown) powered by the engine 20. It is contemplated that other types of propulsion system, such as propellers, could be used. The water jet propulsion system 80 pressurizes water and accelerates it to create thrust. The water is first scooped from under the hull 12 through an inlet grate. The inlet grate prevents large rocks, weeds, and other debris from entering the water jet propulsion system. Water then flows through the water intake ramp. From the intake ramp, water then enters the jet pump. The jet pump is made of two main parts: the impeller and the stator. The impeller is coupled to the engine 20 by one or more shafts, such as a driveshaft and an impeller shaft. The rotation of the impeller pressurizes the water, which then moves over the stator that is made of a plurality of fixed stator blades. The role of the stator blades is to decrease the rotational motion of the water so that almost all the energy given to the water is used for thrust, as opposed to swirling the water. Once the water leaves the jet pump, it goes through the venturi. Since the venturi's exit diameter is smaller than its entrance diameter, the water is accelerated further, thereby providing more thrust. A steering nozzle is pivotally attached to the venturi through a vertical pivot point. The steering nozzle is operatively connected to the helm assembly 60 via a push-pull cable (not shown) such that when the handlebar helm assembly 60 is turned, the steering nozzle pivots, redirects the water coming from the venturi, so as to steer the watercraft in the desired direction. The watercraft 10 is also provided with a reverse gate (not shown). The reverse gate can be lowered behind the steering nozzle so as to redirect water coming from the steering nozzle towards a front of the watercraft 10, thereby causing the watercraft to move in a reverse direction.

The sponsons 100 are located on both sides of the hull 12 near the transom 54. The sponsons 100 form a channel 102 (see FIG. 3) with the hull 12 that gives the watercraft 10 both lift while in motion and improved turning characteristics.

Turning now to FIGS. 2 to 9, the starboard sponson 100 will be described in more detail. Although not described herein in detail, it should be understood that the port sponson 100 is a mirror image of the starboard sponson 100.

As can be seen, the sponson 100 is made of two main parts: a mounting rail 104 and a sponson body 106. The sponson body 106 is a plate. It is contemplated that the sponson body 106 could have other shapes. For example the sponson body 106 could have a generally triangular lateral cross-section providing an arcuate undersurface. The sponson body 106 has a vane 108 extending away from a side thereof. The vane 108 is integrally formed with the sponson body 106. It is contemplated that the vane 108 could be connected otherwise to the sponson body 106, such as by fasteners. The vane 108 will be described in greater detail below. The sponson body 106 has a front end 110, a rear end 112, a top edge 114 and a bottom edge 116. The sponson body 106 has five oblong recesses 118 each having three apertures 120 formed therein. Threaded fasteners 122 are inserted through one aperture 120 of each set of three apertures 120 and are received in five corresponding threaded apertures (not shown) formed in the outer surface 124 (FIG. 6) of the mounting rail 104, thus fastening the sponson body 106 to the mounting rail 104. It is contemplated that the recesses 118 could be omitted. Since there are three apertures 120 per oblong recess 118, the sponson body 106 can be fastened to the mounting rail 104 in a plurality of positions. It is contemplated that only one, two or more than three apertures 120 could be provided per oblong recess 118. It is contemplated that each set of three apertures 120 could be replaced by a single oblong aperture, thereby providing for finer adjustments. It is also contemplated that the apertures 120 could be disposed so as to permit adjustment of a pitch of the sponson body 106 relative to the mounting rail 104. Alternatively or additionally, it is contemplated that a plurality of apertures could be provided in the mounting rail 104 for each set of apertures 120 thereby providing different attachment points to provide the plurality of positions. It is contemplated that more or less than five sets of apertures 120 could be provided. It is also contemplated that the sponson body 106 could be connected to the mounting rail 104 by other means, such as an adhesive for example. It is also contemplated that the mounting rail 104 could be integrally formed with the sponson body 106. It is also contemplated that the mounting rail 104 could be omitted and that the sponson body 106 could be mounted directly to the hull 12. It is also contemplated that spacers or other elements could be disposed between the sponson body 106 and the hull 12 instead of using the mounting rail 104. As can be seen in FIGS. 3 and 6 to 8, when it is connected to the mounting rail 104, the sponson body 106 extends vertically below the mounting rail 104.

Figure 3:
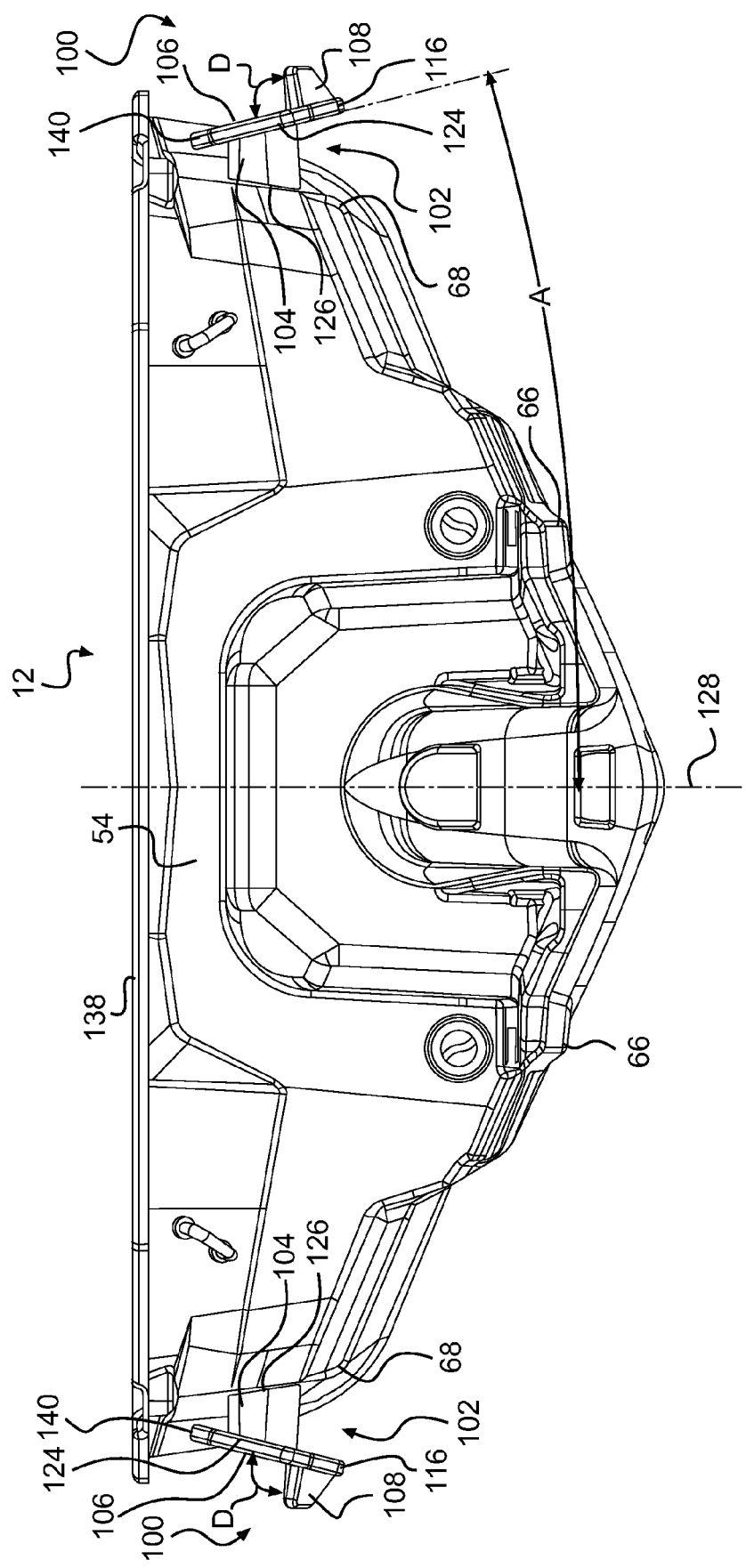
FIG. 3 is a rear elevation view the hull of the watercraft of FIG. 1.

As best seen in FIG. 6, the outer surface 124 of the mounting rail 104 is angled relative to an inner surface 126 of the mounting rail 104 such that the top edge 114 of the sponson body 106 is disposed closer to the inner surface 126 than the bottom edge 116 of the sponson body 106. As a result, as seen in FIG. 3, when the starboard sponson 100 is mounted to the starboard side of the hull 12, the sponson body 106 is angled relative to a longitudinal center plane 128 of the watercraft 10 such that the top edge 114 of the sponson body 106 is disposed closer to the longitudinal centerplane 128 than the bottom edge 116 of the sponson body 106. In the present embodiment, an angle A between the sponson body 106 and the centerplane 128 is about 15 degrees. It is contemplated that the angle A could be any other angle in order to provide a desired performance characteristic. It is also contemplated that the sponson body 106 could be parallel to the centerplane 128.

To fasten the mounting rail 104 to the hull 12, and therefore the sponson 100, five apertures are provided in the inner side 126 of the mounting rail 104 and five threaded fasteners 130 are inserted through corresponding apertures in the hull 12 and the five apertures. It is contemplated that the fasteners 130 and their corresponding apertures could be omitted and that the fasteners 122 could extend through the hull 12, such that the fasteners 122 fasten the sponson body 106 to the mounting rail 104 and fasten the sponson 100 to the hull 12.

The vane 108 will now be described in more detail. The vane 108 is a pentagonally shaped plate that is angled such that a front end 134 of the vane 108 is disposed closer to the bottom edge 116 than the rear end 136 of the vane 108. It is contemplated that the vane 108 could have another shape, such as rectangular. It is also contemplated that the vane 108 could be curved (as seen from a lateral side of the sponson 100) and/or could have a hydrofoil-shaped cross-section. An angle B (FIG. 2) between the vane 108 and the bottom edge 116 is less than 20 degrees. It is contemplated that the angle B could be an angle of less than 45 degrees. When the sponson 100 is mounted to the hull 12, an angle C (FIG. 2) between the vane 108 and a top edge 138 of the hull 12 is less than 20 degrees. It is contemplated that the angle C could be an angle of less than 45 degrees. It is also contemplated that the vane 108 could be rotatably connected to the sponson body 106 such that the angle B (and therefore the angle C). In such an embodiment, it is contemplated that the vane 108 could be moved manually or via an electric, mechanic or hydraulic actuator. To provide a surface over which the water that is deflected upwardly by the vane 108 can flow, the sponson body has a raised rear portion 140. It is contemplated that the raised rear portion 140 could be omitted. As can be seen in FIG. 3, the vane 108 extends at an angle D of about 90 degrees from the sponson body 106. It is contemplated that the angle D could be another angle suitable for a desired performance characteristic.

As can be seen in FIG. 4, the vane 108 is disposed on a rearward half of the sponson body 106, and as such the vane 108 is disposed on a rearward third of the hull 12. A length L1 of the vane 108 is less than a third of a length L2 of the sponson body 106. It is contemplated that the length L1 could be less than a half of the length L2.

During operation of the watercraft 10, when the watercraft 10 is operating in a straight ahead direction on a water body with no waves, the vanes 108 are out of the water and have no effect on the operation and handling of the watercraft 10. When the watercraft 10 makes a right turn, the watercraft 10 leans/rolls to the right and the vane 108 of the starboard sponson 100 goes under the water. Since the vane 108 has the angle C, the water flowing over the vane 108 is deflected upwardly and as a result creates a downward force on the vane 108. This increases the leaning of the watercraft 10 toward the right and reduces the turning radius of the watercraft 10. The vane 108 on the port sponson 100 similarly reduces the turning radius of the watercraft 10 when making a left turn.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A sponson for a watercraft comprising:
   a mounting rail;
   a sponson body fastened to the mounting rail, the sponson body having a front end, a rear end, a top edge and a bottom edge; and
   a vane connected to a side of the sponson body and extending away therefrom, the vane having a front end and a rear end, the front end of the vane being disposed closer to the bottom edge of the sponson body than the rear end of the vane,
   the mounting rail having an inner surface adapted to abut a hull of the watercraft and an outer surface abutting the sponson body, the outer surface being angled relative to the inner surface such that the top edge of the sponson body is disposed closer to the inner surface than the bottom edge of the sponson body.

2. The sponson of claim 1, wherein the vane extends generally perpendicularly to the sponson body.

3. The sponson of claim 1, wherein the sponson body is a plate.

4. The sponson of claim 1, wherein the vane is disposed rearwardly of a longitudinal center of the sponson body.

5. The sponson of claim 1, wherein a length of the vane is less than half a length of the sponson body.

6. The sponson of claim 5, wherein the length of the vane is less than a third of the length of the sponson body.

7. The sponson of claim 1, wherein an angle between the vane and the bottom edge of the sponson body is less than 45 degrees.

8. The sponson of claim 7, wherein the angle between the vane and the bottom edge of the sponson body is less than 20 degrees.

9. The sponson of claim 1, wherein the vane is a plate.

10. The sponson of claim 9, wherein the plate is pentagonnally shaped.

11. The sponson of claim 1, wherein a position of the sponson body relative to the mounting rail is adjustable.

12. A watercraft comprising:
    a hull;
    a deck disposed on the hull;
    an engine connected to the hull;
    a propulsion system operatively connected to the engine;
    a first mounting rail connected to a starboard side of the hull, the first mounting rail having an inner surface abutting the starboard side of the hull and an outer surface;
    a first sponson body fastened to the first mounting rail and abutting the outer surface of the first mounting rail, the outer surface of the first mounting rail being angled relative to the inner surface of the first mounting rail such that a top edge of the first sponson body is disposed closer to the inner surface of the first mounting rail than a bottom edge of the first sponson body;
    a first vane connected to a side of the first sponson body and extending away therefrom;
    a second mounting rail connected to a port side of the hull, the second mounting rail having an inner surface abutting the port side of the hull and an outer surface;
    a second sponson body fastened to the second mounting rail and abutting the outer surface of the second mounting rail, the outer surface of the second mounting rail being angled relative to the inner surface of the second mounting rail such that a top edge of the second sponson body is disposed closer to the inner surface of the second mounting rail than a bottom edge of the second sponson body; and
    a second vane connected to a side of the second sponson body and extending away therefrom,
    each of the first and second vanes being located in a rearward half of the hull,
    each of the first and second vanes having a front end and a rear end, each of the first and second vanes being angled such that its front end is disposed vertically lower than its rear end.

13. The watercraft of claim 12, wherein each of the first and second vanes is located in a rearward third of the hull.

14. The watercraft of claim 12, wherein an angle between the each of the first and second vanes and a top edge of the hull is less than 45 degrees.

15. The watercraft of claim 14, wherein an angle between the each of the first and second vanes and a top edge of the hull is less than 20 degrees.

16. The watercraft of claim 12, wherein the first vane extends generally perpendicularly to the first sponson body; and
    wherein the second vane extends generally perpendicularly to the second sponson body.

* * * * *